United States Patent
Wang et al.

(10) Patent No.: US 9,639,088 B2
(45) Date of Patent: May 2, 2017

(54) AUTONOMOUS LONG-RANGE LANDING USING SENSOR DATA

(71) Applicant: Sikorsky Aircraft Corporation, Stratford, CT (US)

(72) Inventors: Hongcheng Wang, Farmington, CT (US); Ziyou Xiong, Wethersfield, CT (US); Alan Matthew Finn, Hebron, CT (US); Christopher Stathis, Hamden, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/825,701

(22) Filed: Aug. 13, 2015

(65) Prior Publication Data

US 2016/0306363 A1    Oct. 20, 2016

Related U.S. Application Data

(60) Provisional application No. 62/037,216, filed on Aug. 14, 2014.

(51) Int. Cl.
*G05D 1/04* (2006.01)
*B64C 27/04* (2006.01)
*B64D 47/08* (2006.01)
*G01C 21/00* (2006.01)
*G05D 1/06* (2006.01)
(Continued)

(52) U.S. Cl.
CPC .......... *G05D 1/0684* (2013.01); *B64C 27/04* (2013.01); *B64D 47/08* (2013.01); *G01C 21/005* (2013.01); *G01S 19/15* (2013.01); *G01S 19/48* (2013.01); *G05D 1/042* (2013.01)

(58) Field of Classification Search
CPC ...... G05D 1/0684; G05D 1/042; B64C 27/04; B64D 47/08; B64D 45/08; G01S 17/023
See application file for complete search history.

(56) References Cited

U.S. PATENT DOCUMENTS 7,373,242 B2 * 5/2008 Yamane ................. G01C 11/00
                                                              340/947
8,554,462 B2   10/2013 Lee et al.
(Continued)

FOREIGN PATENT DOCUMENTS

WO        2012015594 A1       2/2012

OTHER PUBLICATIONS

Arora et al.; Infrastructure-free shipdeck tracking for autonomous landing; 2013 IEEE Intl. Conf. on Robotics and Automation; May 6-10, 2013; pp. 323-330.*

(Continued)

*Primary Examiner* — Michael J Zanelli
(74) *Attorney, Agent, or Firm* — Cantor Colburn LLP

(57) ABSTRACT

A method of autonomous landing of an aircraft in a landing area includes receiving, with the processor, sensor signals related to the landing area via a sensor device; obtaining, with the processor, a template of the landing area in response to the receiving of the sensor signals; matching, with the processor, one or more features of the template with the features of the acquired images of the landing area; and controlling, with the processor, each of the sensor device and aircraft control system independently based on said matching.

15 Claims, 4 Drawing Sheets

(51) Int. Cl.
*G01S 19/15* (2010.01)
*G01S 19/48* (2010.01)

(56) References Cited

U.S. PATENT DOCUMENTS

| | | | |
|---|---|---|---|
| 9,478,141 B2* | 10/2016 | Revell | G06K 9/00637 |
| 2010/0039294 A1* | 2/2010 | Feyereisen | G06K 9/0063 340/972 |
| 2012/0261516 A1* | 10/2012 | Gilliland | G01S 17/107 244/183 |

OTHER PUBLICATIONS

Sharp et al.; A vision system for landing an unmanned aerial vehicle; Proc. of the 2001 IEEE Intl. Conf. on Robotics and Automation; May 21-26, 2001; vol. 2, pp. 1720-1727.*
European Search Report for Application No. 15180935.7-1802; Dated Feb. 15, 2016; 9 pages.
S. Saripalli et al.: "Vision-based autonomous landing of an unmanned aerial vehicle", Proceedings/2002 IEEE International Conference on Robotics and Automation: May 11-15, 2002, Washington, D.C., vol. 3, May 31, 2002, pp. 2799-2804, XP055245811, Piscataway, NJ; DOI: 10.1109/ROBOT.2002.1013656; ISBN: 978-0-7803-7276-6.

* cited by examiner

AUTONOMOUS LONG-RANGE LANDING USING SENSOR DATA

CROSS-REFERENCE TO RELATED APPLICATIONS

This application claims the benefit of U.S. provisional patent application Ser. No. 62/037,216, filed Aug. 14, 2014, the entire contents of which are incorporated herein by reference.

BACKGROUND

The subject matter disclosed herein relates generally to the field of autonomous aerial vehicles and, more particularly, to a system and method for autonomous landing of an autonomous aircraft on a ship deck using a pan-tilt-zoom camera.

DESCRIPTION OF RELATED ART

Sea-based operation of autonomous rotorcraft, for example, a helicopter, presents a multitude of challenges. Autonomous rotorcraft must be able to autonomously land on a ship deck for landing or delivering cargo in order to be a viable and effective option in sea-based operations. Additionally, autonomous shipboard landing is a critical capability in the case of intermittent or permanent loss of data link with the ship during landing. These autonomous aerial vehicles can be required to detect the ship deck over a long-range (i.e., at a distance of greater than 3000 feet from the ship, where 3000 feet is representative for a particular UAV and ship) and autonomously land on a ship deck despite the loss of a data link.

Conventionally, autonomous shipboard landing relies on a data link whereby relative positions are exchanged, or a vision based camera sensor with a fixed lens, or a Light Detection And Ranging (LIDAR) sensor for perception. The fixed-lens camera may be rigidly mounted to the aircraft or may be gimbaled. A data link system is useful over all ranges, but depends critically on the data link reliability and that the landing area is clear of obstructions. Fixed-lens camera-based systems are adequate for short range perception, for example, within 1000 feet between the aerial vehicle and the ship (where 1000 feet is representative for a particular camera). However, these systems do not work at a range beyond 1000 feet of the ship due to lack of resolution or poor signal-to-noise ratio. A system for autonomous long-range shipboard landing using perception sensors is desired.

BRIEF SUMMARY

According to an aspect of the invention, a method of autonomous landing of an aircraft in a landing area includes receiving, with the processor, sensor signals related to the landing area via a sensor device; obtaining, with the processor, a template of the landing area in response to the receiving of the sensor signals; matching, with the processor, one or more features of the template with the features of the acquired images of the landing area; and controlling, with the processor, each of the sensor device and an aircraft control system independently based on said matching.

In addition to one or more of the features described above or as an alternative, further embodiments could include using a proportional integral controller to control each of the sensor device and the aircraft control system.

In addition to one or more of the features described above or as an alternative, further embodiments could include controlling a bandwidth of the sensor device at a faster rate than controlling a bandwidth of the aircraft control system.

In addition to one or more of the features described above or as an alternative, further embodiments could include selecting the sensor device in response to an altitude or distance of the aircraft in relation to the landing area.

In addition to one or more of the features described above or as an alternative, further embodiments could include receiving the sensor information from one or more of a regular fixed-lens camera, a pan-tilt-zoom (PTZ) camera and a Light Detection and Ranging (LIDAR) sensor.

In addition to one or more of the features described above or as an alternative, further embodiments could include synthesizing a template of the landing area based on the angle and the distance between the vehicle and the landing area.

In addition to one or more of the features described above or as an alternative, further embodiments could include selecting a template from a plurality of stored templates at a plurality of sizes and angles of the landing area.

In addition to one or more of the features described above or as an alternative, further embodiments could include controlling pan and tilt of a PTZ camera to put an image of the landing area in a center of field of view of the PTZ camera; and adjusting camera zoom to obtain a constant deck size of the landing area.

According to another aspect of the invention, a system for autonomous landing of an aircraft on a landing area, includes a processor; and memory having instructions stored thereon that, when executed by the processor, cause the system to: receive sensor signals related to the landing area via a sensor device; obtain a template of the landing area in response to the sensor signals; match one or more features of the template with the features of the acquired images of the landing area; and control each of the sensor device and aircraft control system independently based on said matching.

In addition to one or more of the features described above or as an alternative, further embodiments could include the processor is configured to use a proportional integral controller to control each of the sensor device and the aircraft control system.

In addition to one or more of the features described above or as an alternative, further embodiments could include wherein the processor is configured to control a bandwidth of the sensor device at a faster rate than control of a bandwidth of the aircraft control system.

In addition to one or more of the features described above or as an alternative, further embodiments could include wherein the processor is configured to select the sensor device in response to an altitude or distance of the aircraft in relation to the landing area.

In addition to one or more of the features described above or as an alternative, further embodiments could include wherein the processor is configured to receive the sensor information from one or more of a regular fixed-lens camera, a pan-tilt-zoom (PTZ) camera and a Light Detection and Ranging (LIDAR) sensor.

In addition to one or more of the features described above or as an alternative, further embodiments could include wherein the processor is configured to synthesize a template of the landing area based on angle and size of the landing area.

In addition to one or more of the features described above or as an alternative, further embodiments could include wherein the processor is configured to store a plurality of templates at a plurality of sizes and angles of the landing area.

Technical function of aspects of the invention above includes extending the range of sensors beyond the capabilities of a regular camera and LIDAR by using a pan-tilt-zoom camera for autonomous landing on a ship deck during data link loss.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments include a pan-tilt-zoom camera-based autonomous landing approach of a rotary-wing aircraft on a deck of a ship, which extends the perception range of the aircraft beyond the capabilities of a regular camera or a LIDAR. For aircraft range beyond 1000 feet of a ship, a long range perception modality, for example, a pan-tilt-zoom camera is used to localize the ship deck/target to keep it in the center of the field of view, and maintain a relatively consistent size of the target. At a range within 1000 feet of the ship, short-range perception modality such as LIDAR in addition to the pan-tilt-zoom camera can be used to estimate the ship deck state and detect clutter, and use closed loop feedback for real time control of the aerial vehicle. Although a particular aircraft range and landing area are illustrated and described in the disclosed embodiment, systems operating at other ranges or landing areas will also benefit from embodiments of the invention.

Figure 1:
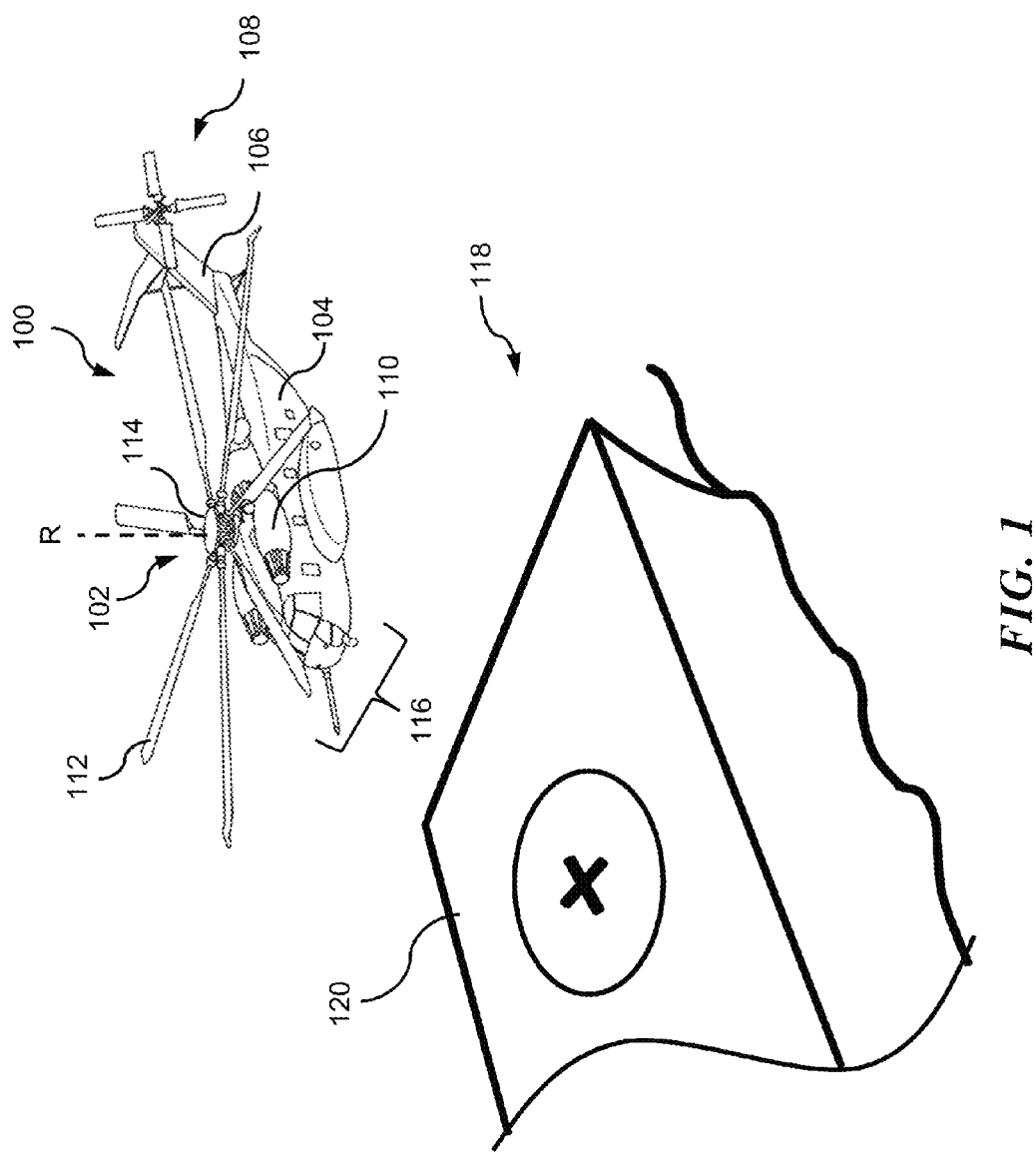
FIG. 1 is a perspective view of an exemplary rotary wing aircraft approaching a ship in accordance with an embodiment of the invention.
Figure 2:
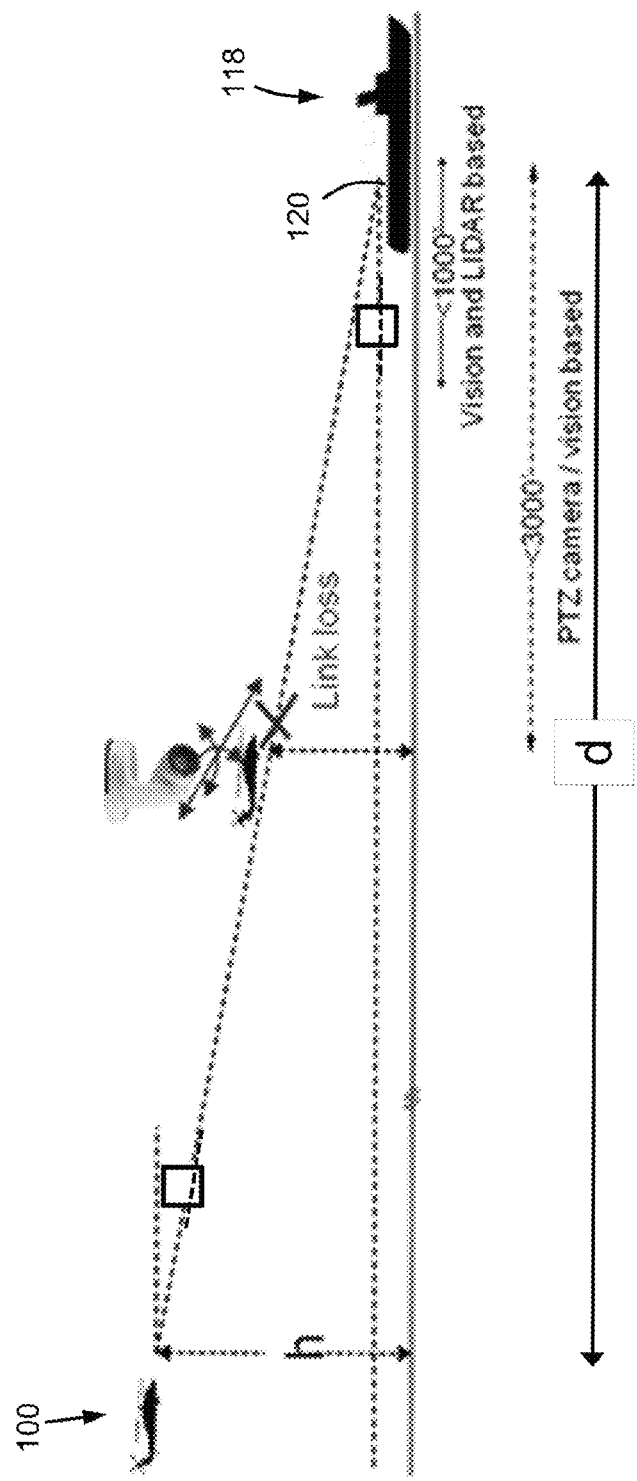
FIG. 2 is another exemplary view of a rotary wing aircraft approaching a ship in accordance with an embodiment of the invention.

FIGS. 1 and 2 illustrate a view of rotary wing aircraft 100 that is moving into a position to autonomously landing on a ship deck 120 on board a ship 118 at sea in accordance with an embodiment of the invention. Aircraft 100, which is shown as a helicopter, is an autonomous aerial vehicle and can include an optionally piloted vehicle or an unmanned aerial vehicle. As shown in FIG. 1, aircraft 100 has a main rotor assembly 102 which is driven about an axis of rotation R through a main gearbox by one or more engines 110. The main rotor assembly 102 includes a multiple of rotor blades 112 mounted to a rotor hub 114. The aircraft 100 also includes an airframe 104 having an extending tail 106 which mounts a tail rotor system 108, such as an anti-torque system, a translational thrust system, a pusher propeller, a rotor propulsion system and the like. Aircraft 100 can include a sensing system 116 having one or more sensing devices that acquire, for example, sensor information on a ship and/or ship deck 120 during the autonomous landing by aircraft 100. Sensing system 116 can include long-range perception sensors and short-range perception sensors. Long-range sensors, for example, a pan-tilt-zoom (PTZ) camera and short-range sensors, for example, a LIDAR sensor device capture information on ship deck 120 for processing by a perception algorithm 210 (FIG. 3) as aircraft 100 approaches ship 118. Sensing system 116 can include an inertial navigation unit such as, e.g., an inertial measurement Unit (IMU) or a Global positioning System (GPS) that may be used to acquire position data related to a current rotation and acceleration of aircraft 100 in order to determine a geographic location of aircraft 100 including a change from its initial position. While sensing system 116 is shown located proximate to nose landing gear of aircraft 100, it will be appreciated that sensors associated with sensing system 116 can be positioned at different locations and orientations on aircraft 100 such as, e.g., at a nose of aircraft 100, at a tail of aircraft 100, or at one or more locations near the body or tail landing gear.

Figure 3:
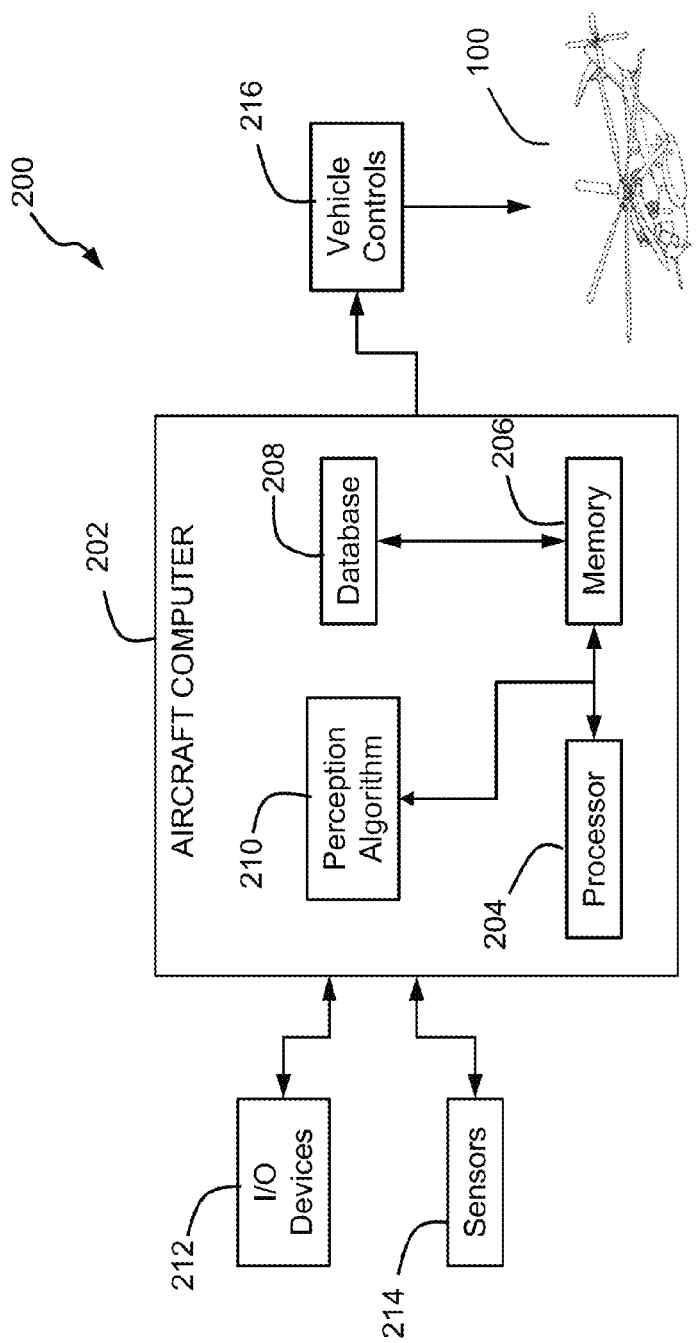
FIG. 3 is a schematic view of an exemplary computing system in accordance with an embodiment of the invention.

Referring to FIG. 2, aircraft 100 is depicted with a loss of data link or communication link with ship 118 and is moving into a position to autonomously land on ship deck 120 in accordance with an embodiment of the invention. Upon an intermittent or permanent loss of data link between aircraft 100 and ship 118, aircraft 100 can acquire sensor information with sensing system 116 related to ship and/or ship deck 120 using the sensing system 116 based on height h and distance d of aircraft 100 to ship deck 120 of ship 118. For example, for a distance d of greater than about 1000 feet between aircraft 100 and ship deck 120, sensing system 116 can leverage the pan, tilt, and zoon capabilities of a PTZ camera in order to acquire information for processing by perception algorithm 210 (FIG. 3) in order to identify ship deck 120 and keep it in the center of the field of view of the PTZ camera as well as maintain a consistent size of the target. Further, for a distance d of around 1000 feet or less between aircraft 100 and ship deck 118, sensing system 116 can use LIDAR to acquire information for processing by perception algorithm 210 (FIG. 3). In addition to using LIDAR above, sensing system 116 can also use a PTZ camera and/or a regular fixed-lens camera in addition to LIDAR for processing by perception algorithm 210 (FIG. 3), as will be described below in reference to FIGS. 3 and 4. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, fixed-wing aircraft, and VTOL rocket-propelled vehicles will also benefit from embodiments of the invention.

FIG. 3 illustrates a schematic block diagram for system 200 on board aircraft 100 in accordance with an exemplary embodiment. As illustrated, system 200 includes aircraft computer 202 that executes instructions for implementing perception algorithm 210. Aircraft computer 202 receives raw sensor data for ship deck 120 and/or ship 118 from one or more sensors 214 that are associated with sensing system 116 (FIG. 1). Sensors 214 can also include sensors for receiving state information on aircraft 100. Computer 202 includes a memory 206 that communicates with a processor 204. Memory 206 may store perception algorithm 210 as executable instructions that are executed by processor 204. Perception algorithm 210 can include additional algorithms that are stored as executable instructions for implementing embodiments of the invention described herein. The instructions may be stored or organized in any manner and at any level of abstraction, such as in connection with the execution of perception algorithm 210. Processor 204 may be any type of processor (such as a central processing unit (CPU) or a graphics processing unit (GPU)), including a general purpose processor, a digital signal processor (DSP), a microcontroller, an application specific integrated circuit (ASIC), a field programmable gate array (FPGA), or the like. Additional processors substantially similar to processor 204 can also be included for control of an aircraft control system that determines aircraft attitude and state of aircraft 100. In an embodiment, processor 204 may include an image processor in order to receive images of ship deck 120 and/or ship 118 (FIGS. 1-2) and process the associated image data using one or more processing algorithms to produce one or more processed signals. Also, in various embodiments, memory 206 may include random access memory (RAM), read only memory (ROM), or other electronic, optical, magnetic, or any other computer readable medium onto which is stored perception algorithm 210.

System 200 may include a database 208. Database 208 can be used to store sensor data that is acquired by sensors 214 on ship deck 120 and/or ship 118 (FIGS. 1-2) as well as sensor data on operating conditions of the aircraft 100 such as, for example, lateral acceleration, attitude, angular rate, and magnitude and direction of wind speed relative to aircraft 100. Also, templates for predetermined position, orientation, appearance, etc. of ship deck 120 and ship 118 that can be used by perception algorithm 210 may be stored in database 208. The data stored in database 208 may be based on one or more other algorithms or processes for implementing perception algorithm 210. Database 208 may be used for any number of reasons. For example, database 208 may be used to temporarily or permanently store data, to provide a record or log of the data stored therein for subsequent examination or analysis, etc. In some embodiments, database 208 may store a relationship between data, such as one or more links between data or sets of data acquired through the various sensor devices of sensing system 116 (FIG. 1) on board aircraft 100. Database 208 can also store multiple 2D templates or a 3D appearance model for ship deck 120 at several sizes and rotation angles.

System 200 may provide one or more controls, such as vehicle controls 216. Vehicle controls 216 may provide directives based on, e.g., data associated with an internal navigation system onboard aircraft 100. Directives provided by vehicle controls 216 may include navigating aircraft 100 for autonomously landing on ship deck 120 (FIGS. 1-2). The directives may be presented on one or more input/output (I/O) devices 212. I/O devices 212 may include a display device or screen, audio speakers, a graphical user interface (GUI), etc. It is to be appreciated that system 200 is illustrative. In some embodiments, additional components or entities not shown in FIG. 3 may be included. In some embodiments, one or more of the components or entities may be optional. In some embodiments, the components or entities of system 200 may be arranged or configured differently from what is shown in FIG. 3. For example, in some embodiments I/O device(s) 212 may be commanded by vehicle controls 216, as opposed to being commanded by processor 204 as shown in FIG. 3.

Figure 4:
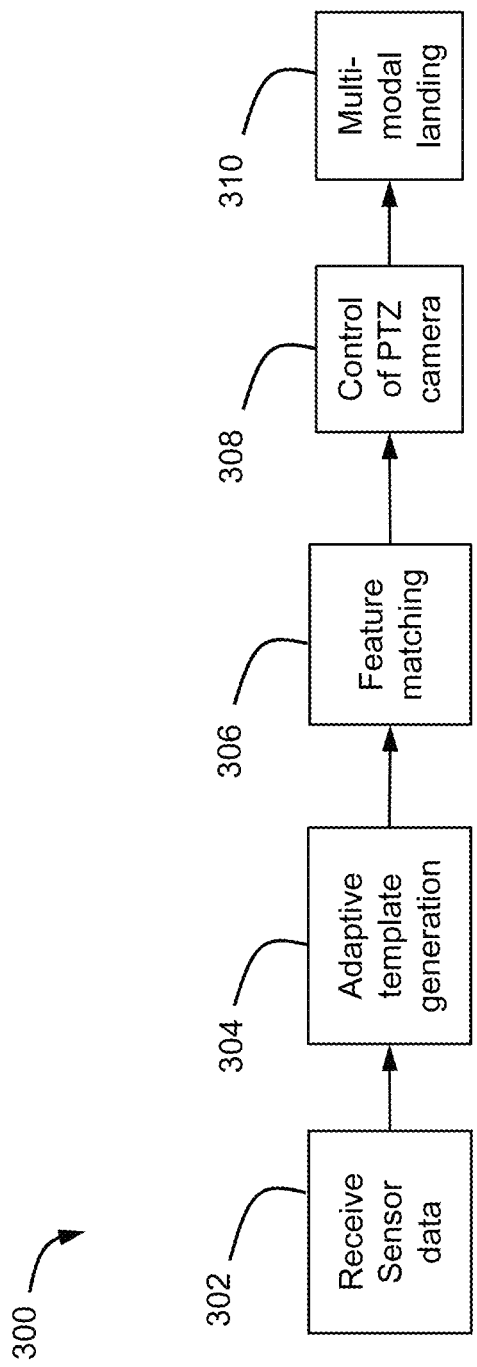
FIG. 4 illustrates a dataflow diagram depicting implementation of a perception algorithm in accordance with an embodiment of the invention.

FIG. 4 illustrates an exemplary data flow diagram 300 that is performed by processor 204 for implementing perception algorithm 210 in accordance with an embodiment of the invention. Particularly, data flow diagram 300 implements perception algorithm 210 with sensor data acquired from sensors 214 (FIG. 3) associated with a PTZ camera and a LIDAR for processing by processor 204 and, as such, FIG. 3 is also referenced in the description of FIG. 4. Prior to initiating process 300, aircraft 100 and ship 118 may exchange communications to confirm the identities of aircraft 100 and ship 118 and determine permission for aircraft 100 to land on ship 118.

In block 302, sensor data on ship deck 120 (FIG. 2) or ship 118 is acquired by sensors 214 based on altitude and/or distance of aircraft 100 from ship 118 (FIG. 2). For example, if the altitude of aircraft 100 and/or its distance to ship deck 120 (FIG. 2) and/or ship 118 (FIG. 2) is greater than about 1000 feet, a PTZ camera can be used to acquire image data of ship deck 120. Images of ship deck 120 are captured and generated for processing by processor 204.

In block 304, adaptive template generation of the ship deck 120 is performed. Initially, an estimate of the orientation of the ship deck 120 from an initial optimization process, e.g., a greedy search, is performed with respect to stored templates of ship deck 120. The orientation of the ship deck 120 is compared through the greedy search over all possible templates. Once detected, an online synthesized template of ship deck 120 is generated adaptively based on real-time sensor data captured by a PTZ camera that is used to match with stored templates of ship deck 120. Also, the angle and size of the ship deck 120 is tracked as well as tracking the distance estimation between ship 118 and aircraft 100. At any instance between aircraft 100 and ship 118, perception algorithm 210 synthesizes a new template (using known projection techniques) from a given two-dimension (2D) or three-dimension (3D) template based on an estimated angle and size of ship deck 120.

In another embodiment, multiple 2D templates of the ship deck 120 are stored for different sizes and rotation angles. The template for matching is selected adaptively based on the estimated angle to the ship deck 120, size of the ship deck 120, and distance between aircraft 100 and ship deck 120.

In block 306, feature matching is performed on the synthesized template using the stored template in order to refine the localization of the ship deck 120. In embodiments, feature matching is performed according to the method disclosed in the non-patent literature publication authored by Ethan Rublee et al., entitled "ORB" an efficient alternative to SIFT or SURF" (*International Conference on Computer Vision*, 2011: 2564-2571) or in the non-patent literature publication authored by Michael Calonder et al., entitled "BRIEF: Binary Robust Independent Elementary Features" (11*th European Conference on Computer Vision (ECCV)*, 2010*, Lecture Notes in Computer Science Volume* 6314: pp 778-792).

In block 308, a proportional integral (PI) controller is used to control the PTZ camera pan and tilt in order to put the ship deck 120 in the center of the field of view. Control of pan and tilt stabilizes the ship deck 120 in the center of the field of view of the PTZ camera. Also, PTZ camera zoom is adjusted to obtain a constant size of ship deck 120 using the pan and tilt angles and the estimated distance between aircraft 100 and the ship 118. In an example, the zoom factor of the PTZ camera is set proportional to the distance of the aircraft 100 from the ship deck 120. A reference zoom is set at, for example, a reference distance of 1200 feet. At run time, the zoom is set such that the ratio between the zoom factor and the distance between aircraft 100 and ship deck 120 is constant. The zoom factor is set according to Equation (1).

$$\frac{Z_t}{I_t} = \frac{Z_{ref}}{I_{ref}} \quad (1)$$

where:
$Z_t$ is the zoom factor of the PTZ camera;
$I_t$ is the distance of the aircraft from the ship deck;
$Z_{ref}$ is a reference zoom; and
$I_{ref}$ is a reference distance.

Aircraft 100 attitude control and PTZ control is configured as a nested control system. Attitude control and PTZ control are controlled individually. For example, aircraft 100 attitude is under closed loop control as it navigates towards ship deck 120 and control of pan, tilt, and zoom must be computed faster (i.e., at a higher bandwidth) than the bandwidth of the closed loop control of aircraft 100. In this way, the attitude of the aircraft 100 appears "quasi-stationary" to the PTZ control.

In block 310, when aircraft 100 is within the range of LIDAR sensor device of the ship deck 120, the regular fixed-lens camera and/or the PTZ camera can be used to localize the deck pattern or features and estimate deck status as aircraft 100 approaches ship deck 100 for an autonomous landing. Alternatively, a combination of a LIDAR sensor device and a PTZ camera can be used. The LIDAR sensor device can be used, e.g., to identify clutter on the ship deck 120. A combination of both LIDAR and PTZ camera modalities gives better control and landing for short-range perception. The fusion of these, or other, sensors may be accomplished by any of a variety of well-known techniques, e.g., Bayesian inference.

The benefits of the embodiments of the invention described herein include a pan-tilt-zoom camera-based autonomous landing approach of a rotary-wing aircraft on a deck of a ship, which extends the perception range of the aircraft beyond the capabilities of a regular fixed-lens camera or a LIDAR.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of autonomous landing of an aircraft in a landing area, the method comprising:
receiving, with a processor, sensor signals related to the landing area via a sensor device, wherein the sensor device is operable to maintain a relative orientation and size of the landing area;
obtaining, with the processor, a template of the landing area in response to the receiving of the sensor signals;
matching, with the processor, one or more features of the template with one or more features acquired from the sensor signals related to the landing area; and
controlling, with the processor, each of the sensor device and an aircraft control system independently based on said matching.

2. The method of claim 1, further comprising using a proportional integral controller to control each of the sensor device and the aircraft control system.

3. The method of claim 2, controlling a bandwidth of the sensor device at a faster rate than controlling a bandwidth of the aircraft control system.

4. The method of claim 1, further comprising selecting the sensor device in response to an altitude or distance of the aircraft in relation to the landing area.

5. The method of claim 1, further comprising receiving sensor signals from one or more of a regular fixed-lens camera, a pan-tilt-zoom (PTZ) camera and a Light Detection and Ranging (LIDAR) sensor.

6. The method of claim 1, further comprising synthesizing a template of the landing area based on the angle and the distance between the aircraft and the landing area.

7. The method of claim 1, further comprising selecting a template from a plurality of stored templates at a plurality of sizes and angles of the landing area.

8. The method of claim 1, further comprising:
controlling pan and tilt of a PTZ camera to put an image of the landing area in a center of field of view of the PTZ camera; and
adjusting camera zoom to obtain a constant deck size of the landing area.

9. A system for autonomous landing of an aircraft on a landing area, the system comprising:
a processor; and
memory having instructions stored thereon that, when executed by the processor, cause the system to:
receive sensor signals related to the landing area via a sensor device, the sensor device being operable to maintain a relative orientation and size of the landing area;
obtain a template of the landing area in response to the sensor signals;
match one or more features of the template with one or more features acquired from the sensor signals related to the landing area; and
control each of the sensor device and an aircraft control system independently based on said matching.

10. The system of claim 9, wherein the processor is configured to use a proportional integral controller to control each of the sensor device and the aircraft control system.

11. The system of claim 10, wherein the processor is configured to control a bandwidth of the sensor device at a faster rate than control of a bandwidth of the aircraft control system.

12. The system of claim 9, wherein the processor is configured to select the sensor device in response to an altitude or distance of the aircraft in relation to the landing area.

13. The system of claim 9, wherein the processor is configured to receive the sensor signals from one or more of a regular fixed-lens camera, a pan-tilt-zoom (PTZ) camera and a Light Detection and Ranging (LIDAR) sensor.

14. The system of claim 9, wherein the processor is configured to synthesize a template of the landing area based on angle and size of the landing area.

15. The system of claim 9, wherein the processor is configured to store a plurality of templates at a plurality of sizes and angles of the landing area.

\* \* \* \* \*